United States Patent [19]

Harville

[11] Patent Number: 4,976,418

[45] Date of Patent: Dec. 11, 1990

[54] BORING BAR-CUTTER HEAD FIXTURE

[76] Inventor: Terry L. Harville, 414 Albany Ave., Deland, Fla. 32724

[21] Appl. No.: 437,349

[22] Filed: Nov. 16, 1989

[51] Int. Cl.⁵ .............................................. B25B 1/20
[52] U.S. Cl. ............................... 269/43; 269/259 CS; 269/54.1
[58] Field of Search ........................ 269/43, 47, 49, 48, 269/54.1, 152, 254 CS, 75

[56] References Cited

U.S. PATENT DOCUMENTS

| 2,105,954 | 1/1938 | Rippe | 269/43 |
| 3,823,862 | 7/1974 | Reedy et al. | |
| 4,338,712 | 7/1982 | Dearman | |
| 4,381,104 | 4/1983 | Nelsen | 269/43 |
| 4,524,959 | 6/1985 | Kuba | 269/43 |
| 4,712,779 | 12/1987 | Dearman | 269/43 |

Primary Examiner—Robert C. Watson

[57] ABSTRACT

A fixture for accurately aligning a boring bar and cutter head to facilitate a brazing operation at the interface between the boring bar and cutter head. A triangular seating element on the base of the fixture fits into a tool-reception pocket in the cutter head to locate the cutter head. A clamp mechanism extends laterally from a support post structure to suspend the boring bar directly above the cutter head.

9 Claims, 1 Drawing Sheet

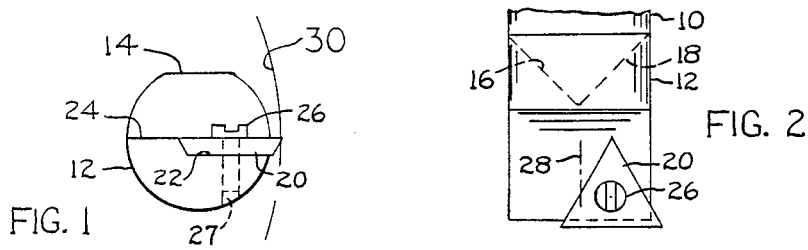
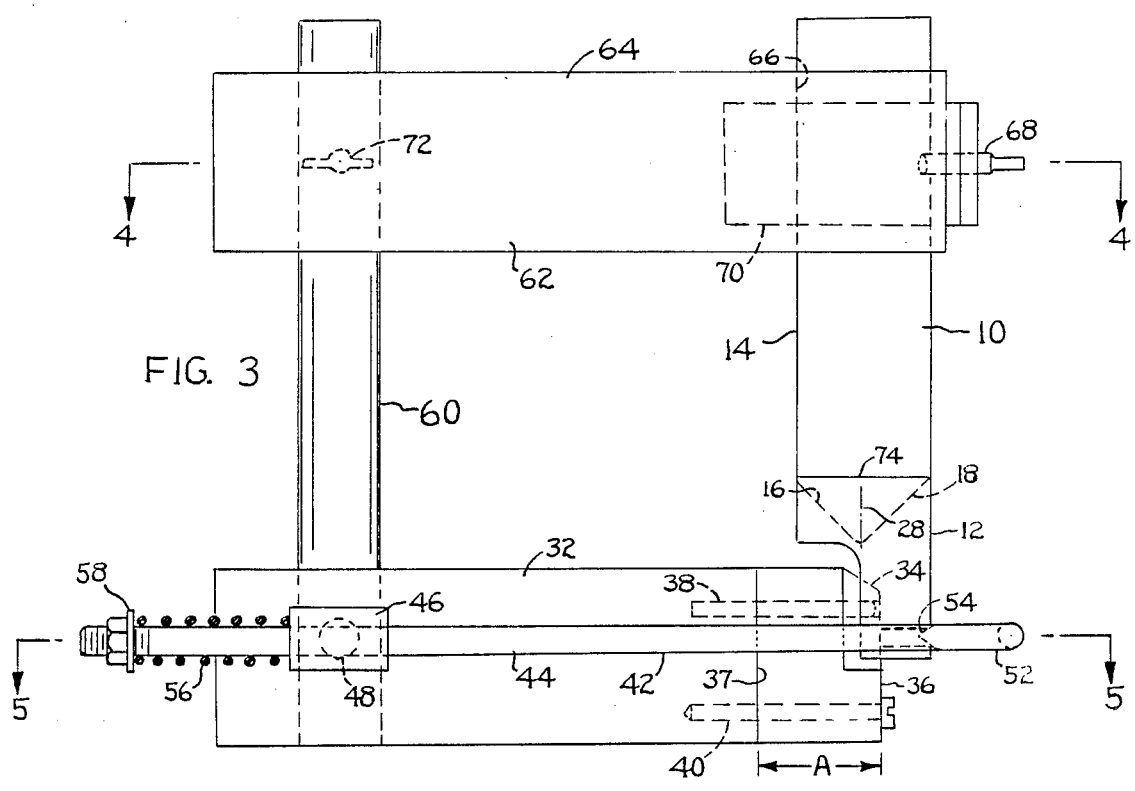
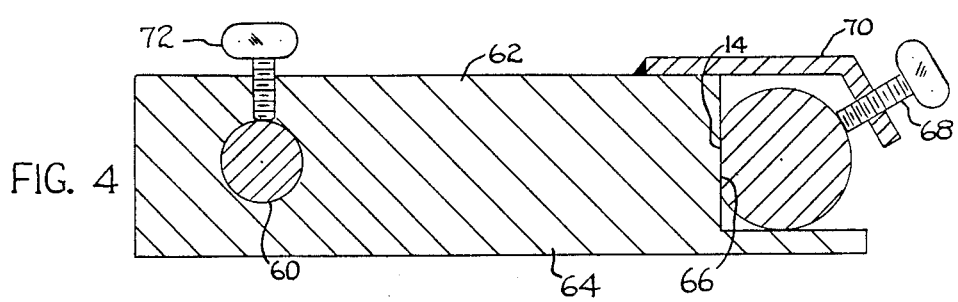
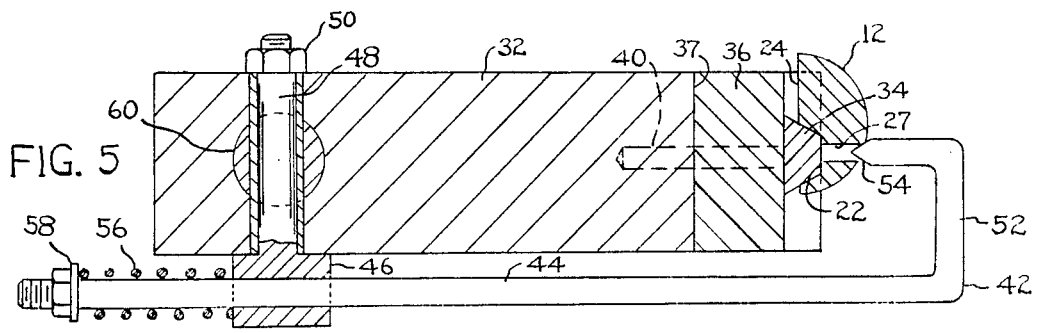

BORING BAR-CUTTER HEAD FIXTURE

BACKGROUND AND SUMMARY OF THE INVENTION

This invention relates to boring tools, and particularly to a fixture for holding and precisely aligning a replaceable cutter head and a boring bar for joinder together by silver soldering.

The boring bars and cutter heads are commonly supplied in a range of diameters, such as ⅜ inch, ½ inch, ⅝ inch, ¾ inch and 1 inch. Each cutter head is formed with a pocket that receives a triangular cutting tool(insert) that can be rotatably adjusted to present different cutting edges to the work requiring machining. Each boring bar can be a circular cross-sectioned bar having a conical end adapted to fit into a conical socket in the cutter head; the conical surfaces are brazed together to join the bar to the head.

These boring bars and cutter heads are commercially available as separate units or as single units already assembled. One commercial source for such boring bars and cutter heads is the Kennemetal Corp. of Latrobe, Pa.

A problem arises when the customer attempts to braze a boring bar to a cutter head without the aid of a fixture to hold and accurately align the separate pieces during the brazing operation. The brazed assembly can be operationally deficient, due for example to the cutting edge of the tool (insert) being above or below the proper cutting position, or at an incorrect approach angle.

The present invention relates to a fixture that can be used by the customer to properly align the cutter head and boring bar during a brazing operation. The fixture is designed for ready use by a person who does not have precise knowledge of the geometry necessary to achieve accurate alignment of the bar and cutter head.

The fixture comprises a base having a laterally projecting seat element adapted to fit into the tool-reception pocket of a cutter head. A slidable retainer is mounted on the base to push the cutter head against the projecting seat element; the seat element and retainer cooperatively hold the cutter head in a precise position suitable for brazing to the associated boring bar. The boring bar is suspended above the cutter head by means of a clamp structure that is mounted on a vertical post extending upwardly from the base (which holds the cutter head).

The fixture is designed so that the user is not required to perform complex adjusting operations in order to accurately align the boring bar and cutter head. The fixture has non-adjustable reference surfaces thereon that are engagable with surfaces of the boring bar and cutter head to achieve a properly aligned assembly without special manual adjustments or measurements.

In order to adapt the fixture to use with various different diameter boring bars and cutter heads the fixture includes a common base and a series of different interchangeable triangular seating elements; each seating element has its own mounting block adapted to be releaseably secured to an upstanding side face of the base.

the invention provides a relatively low cost fixture that can be used to accurately align a cutter head and boring bar for brazing operations thereon. Interchangeable parts of the fixture permit the fixture to be used with a range of different diameter boring bars and cutter heads.

THE DRAWINGS

FIG. 1 is an end view of a boring bar-cutter head assembly of the type with which the present invention is concerned.

FIG. 2 is a fragmentary top plan view of the FIG.1 assembly.

FIG. 3 is an elevational view of a fixture of the present invention. The fixture is adapted to align the cutter head and boring bar shown in FIGS. 1 and 2.

FIG. 4 is a sectional view on line 4—4 in FIG. 3.

FIG. 5 is a sectional view on line 5—5 in FIG. 3.

DESCRIPTION OF A PREFERRED EMBODIMENT OF THE INVENTION

FIGS. 1 and 2 fragmentarily show a conventional boring unit that includes an elongated bar 10 (only partially visible in FIG. 2) and cutter head 12. The upper surfaces of the bar and head have flats 14 extending therealong. When bar 10 is mounted in the tool holder on a lathe carriage the flat 14 on the bar will properly orient the bar and cutter head relative to the work being machined.

The cutter head 12 has a conical socket (cavity) 16 in its end face. A mating conical end 18 is formed on bar 10. The conical surfaces may be silver plated and brazed to affix the cutter head to the boring bar.

Actual cutting of the work is performed by a triangular insert (tool) 20 that fits into a triangular pocket 22 indented into a flat axial surface 24 formed on head 12. Screw 26 extends though insert 20 into a threaded hole 27 in head 12 to retain insert 20 in pocket 22. Pocket 22 is offset from the centerline 28 of head 12 so that one corner of triangular tool 20 projects beyond the side surface of the cutter head. The projecting corner of the tool acts as a cutting tip for penetration into the work surface.

During service, bar 10 and cutter head 12 are stationary in a rotational sense. The bar-cutter head assembly is mounted on a lathe carriage that can be moved axially and also transversely (normal to centerline 28) such that tool 20 can be adjusted axially and radially. The work to be machined is mounted in a rotary chuck structure for rotation around an axis normal to the direction of movement of the lathe carriage. As the work turns the projecting corner of triangular tool insert 20 penetrates the work surface, indicated partially by numeral 30 in FIG. 1. Insert 20 is formed of a relatively hard material that will retain a sharp cutting tip (corner), e.g. a hard ceramic material or high speed steel alloy.

The triangular shape of the tool insert enables the tool to have three potential cutting tips, i.e. the three corners of the triangle. To adjust the triangular insert so that a "new" tip is presented to the work surface the screw 26 is loosened, and the triangular insert lifted and rotated one third of a revolution; the insert will then seat within pocket 22, with a "new" tip thereof projecting beyond the side surface of cutter head 12.

The present invention relates to a fixture adapted to accurately align cutter head 12 and bar 10 so that when a brazing operation is performed on the bar-cutter head joint the cutter head will have the capability of being properly oriented to the work surface for achievement of an optimum cutting action thereon. While cutter head 12 is held in the aligning fixture the tool insert 20 and attachment screw 26 are removed (temporarily until after completion of the brazing operation).

The aligning fixture comprises a rectangular base 32 having a triangular seat element 34 thereon for engagement in the pocket 22 of cutter head 12, whereby the cutter head is held with its axis 28 oriented vertically. Seat element 34 is an integral part of a block structure 36 that is removably mounted on base 32 by means of a dowel pin 38 and screw 40; block structure 36 seats against vertical side face 37 of base 32. By unloosening screw 40 it is possible to remove block structure 36 and replace it with another block structure having a differently sized seat element 34 adapted to interfit with a differently sized cutter head 12. Base 32 is adapted to be used interchangeably with different block structures 36 to support a range of different cutter heads.

The cutter head is held against triangular seat element 34 with a rod-like retainer 42. The retainer includes an elongated straight rod section 44 that extends slidably through a guide block 46. The guide block is pivotaby mounted on base 32 by means of a pivot shaft 48. As shown in FIG. 5, shaft 48 is integral with the guide block; the shaft extends completely through base 32, with a nut 50 threaded onto the exposed end of the shaft. A shoulder is formed on the shaft, such that the guide block is free to pivot around the shaft axis.

Retainer 42 includes a U-section 52 that defines a convergent tip 54 adapted to seat within threaded hole 27 in cutter head 12. The retainer is biased leftwardly (FIGS. 3 and 5) by means of a compressed coil spring 56 that encircles rod section 44 in the space between guide block 46 and washer 48.

Retainer tip 54 exerts a leftward pushing force on cutter head 12, such that the cutter head is held in a fixed position dictated by the contours on triangular seat element 34. Element 34 will have the same outer surface contour as tool insert 20. However, seat element 34 is somewhat elongated in the vertical direction, such that cutter head 12 is prevented from contact with block structure 36. Cutter head 12 makes contact only with seat element 34 and retainer tip 54.

Retainer 42 has three degrees of motion. It can slide longitudinally along the axis defined by rod section 44. Also, it can rotate in guide 46 around the longitudinal axis of rod section 44. Additionally, it can swing with guide block 46 in a vertical arc around the axis of transverse shaft 48. The three degrees of motion enable retainer tip 54 to readily enter into threaded hole 27 even though the hole will be located differently in the differently sized cutter heads. The position of the cutter head in the fixture is established by seat element 34; retainer 42 merely provides a push force to maintain the cutter head in pressure engagement with seat element 34. The retainer can be manually moved into (or out of) contact with hole 27.

As shown in FIG. 3, there is an upstanding post 60 affixed to base 32. A rectangular clamp mechanism 62 is carried on post 60 to suspend the boring bar 10 in a vertical position directly above cutter head 12. Clamp mechanism 62 includes a solid rectangular member 64 having a flat vertical reference surface 66 thereon adapted to engage the flat 14 on bar 10. A bar-gripper set screw 68 is threaded through a plate 70 carried by member 64, such that the boring bar is held firmly against reference surface 66.

Reference surface 66 is oriented to be a given distance from the axis of post 60, such that boring bar 10 will have its axis in direct vertical alignment with axis 28 of cutter head 12. Member 64 could be affixed to post 60. However, as shown, member 64 is held on the post by means of a set screw 72. Member 64 can be raised or lowered on the post. Member 64 can also be swung around the post axis.

In use of the fixture the cutter head 12 will first be located on seat element 34. Boring bar 10 will then be positioned against reference surface 14 and lowered onto cutter head 12 so that its conical end 18 seats within conical cavity 16. This bar lowering operation can be accomplished either by moving member 64 downwardly (with screw 68 tightened against the bar), or by sliding bar 10 downwardly along reference surface 66 with screw 68 in a slightly loosened condition.

The surface contact between conical end surface 18 and cavity surface 16 is concealed from view; hence it is not possible to directly know whether the conical surfaces are making proper contact. However, if there is proper contact the peripheral interface joint 74 between bar 10 and head 12 will have a uniform line thickness around the joint circumference when the conical surfaces are in proper contact. By viewing external joint 74 the user of the fixture can ascertain when proper alignment between the bar and cutter head is obtained.

The fixture is designed so that joint 74 is freely accessible around the bar-head circumference. The brazing operation can be performed quickly without need for repositioning the components during the operation. Removal of the assembled bar and cutter head is easily accomplished.

When it is desired to use the fixture for assembling differently sized boring bars and cutter heads the block structure 36 will be replaced with another block structure of the appropriate size. Clamp mechanism 62 need not be changed because the various block structures 36 will be sized so that block structure dimension A (FIG. 3) correctly positions the associated triangular seat element 34 relative to references surface 66. Dimension A will be different for different boring bar sizes.

I claim:

1. A brazing fixture for positioning a boring bar and cutter head together so that the bar is located directly above the bar, with the bar axis and head axis in vertical alignment; said fixture comprising a base having a seat element projecting laterally therefrom to fit into a tool-reception pocket in the cutter head, a retainer slidably mounted on the base for motion generally normal to the cutter head axis, said retainer having a tip movable toward or away from the sea element, whereby the cutter head is held between the seat element and retainer tip, and a spring means (56) operatively trained between the base and retainer for biasing said retainer toward said seat element so that the retainer tip has pressure engagement with the cutter head; and a clamp means located above the base for holding a boring bar in a vertical position; said clamp means having a vertical reference surface oriented to said seat element so that the bar has its axis in vertical alignment with the cutter head axis, and a bar gripper component movable toward said reference surface to hold the bar thereagainst.

2. The fixture of claim 1, and further comprising a guide element (46) slidably engaged with said retainer, and shaft means (48) pivotably mounting said guide element around a horizontal axis offset from the cutter head axis.

3. The fixture of claim 2, wherein said retainer comprises a rod slidably extending through said guide element in intersecting relation to the guide element pivot axis.

4. The fixture of claim 3, wherein said retainer rod has a rotary fit in the guide element.

5. The fixture of claim 4, wherein said spring means is a coil spring encircling the retainer rod; one end of said spring being operatively connected to the rod, and the other end of the spring being connected to the guide element.

6. A brazing fixture for positioning a boring bar and cutter head together so that the bar is located directly above the bar, with the bar axis and head axis in vertical alignment; said fixture comprising a base having a seat element projecting laterally therefrom to fit into a tool-reception pocket in the cutter head, a guide block (46) pivotably attached to said base for swinging motion around a horizontal axis offset laterally from the cutter head axis, and a retainer comprising a rod having a straight section slidably extending through the guide block and a U-section extending from said straight section, one leg of said U-section extending from said straight section, one leg of said U-section being an axial extension of said straight section and the other leg of said U-section forming a retainer tip, said retainer being movable in the guide block toward or away from the seat element, whereby the cutter head is held between the seat element and retainer tip; and a clamp means located above the base for holding a boring bar in a vertical position; said clamp means having a vertical reference surface oriented to said seat element so that the bar has its axis in vertical alignment with the cutter head axis, and a bar gripper component movable toward said reference surface to hold the bar thereagainst.

7. The fixture of claim 6, and further comprising a coil spring encircling the straight section of said retainer rod to move the retainer tip toward said seat element.

8. A brazing fixture for positioning a boring bar and cutter head together so that the bar is located directly above the bar, with the bar axis and head axis in vertical alignment; said fixture comprising a base having a vertical side face (37), a mounting block (36) abutting against said side face, a dowel pin and clamp screw extending through the mounting block into the base to removably attach said block to the base, a cutter head seat element (34) projecting from said mounting block to fit into a tool reception pocket in the cutter head, and a retainer slidably mounted on the base for motion generally normal to the cutter head axis; said retainer having a tip movable toward or away from the seat element, whereby the cutter head is held between the seat element and retainer tip; and a clamp means located above the base for holding a boring bar in a vertical position; said clamp means having a vertical reference surface oriented to said seat element so that the bar has its axis in vertical alignment with the cutter head axis, and a bar gripper component movable toward said reference surface to hold the bar thereagainst.

9. The fixture of claim 8, and further comprising a vertical post (60) extending upwardly from said base, said clamp means being mounted on said post in cantilever fashion spaced above the base; said post and clamp means having engaged surfaces that enable the clamp means to swing horizontally around the post axis and also to move vertically along the post toward or away from the base.

* * * * *